June 18, 1940.  D. T. BEARDSLEY  2,205,237
BORING DEVICE
Filed Jan. 12, 1938   2 Sheets-Sheet 1
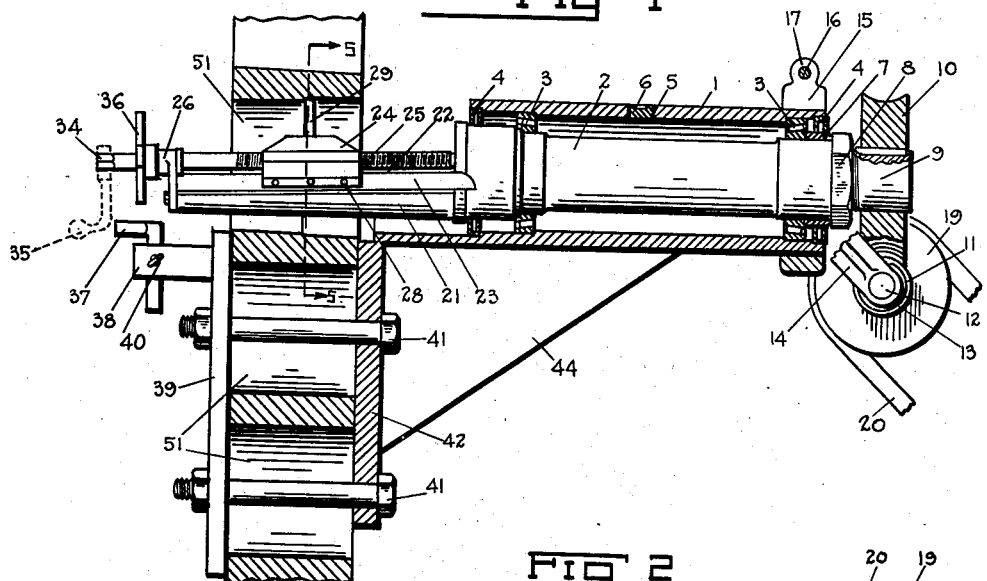
INVENTOR.
DILWARD T. BEARDSLEY
BY Charles Ruvernier
ATTORNEY.

June 18, 1940.    D. T. BEARDSLEY    2,205,237
BORING DEVICE
Filed Jan. 12, 1938    2 Sheets-Sheet 2
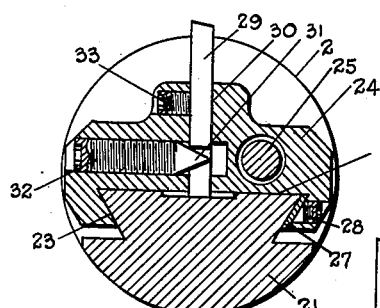
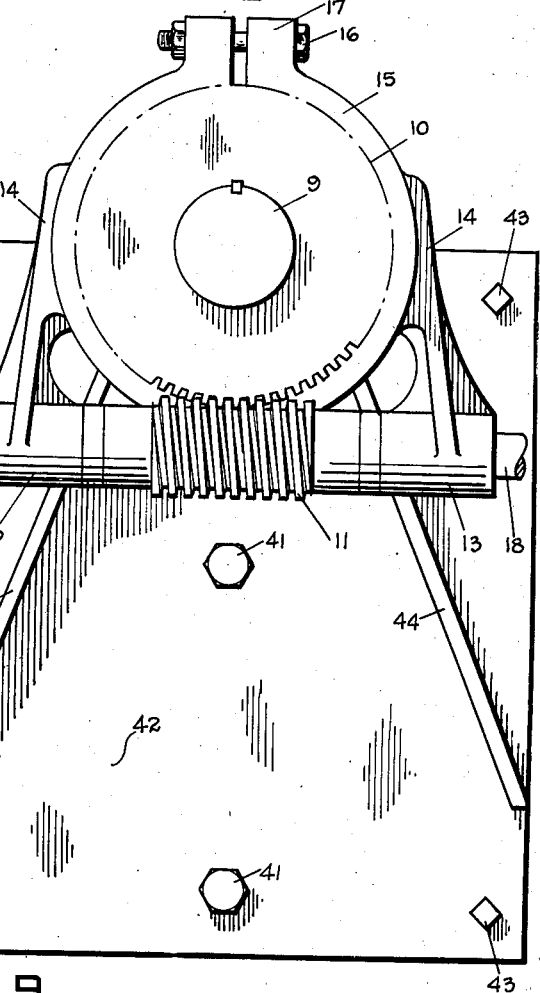
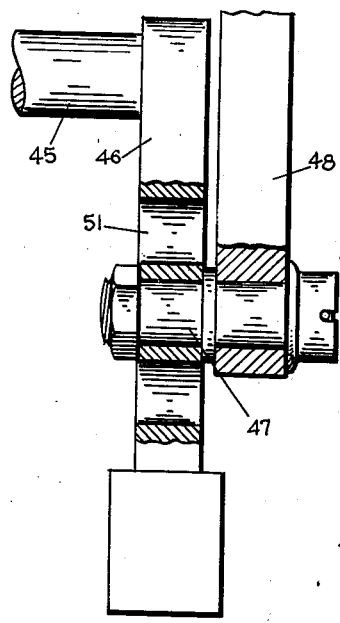
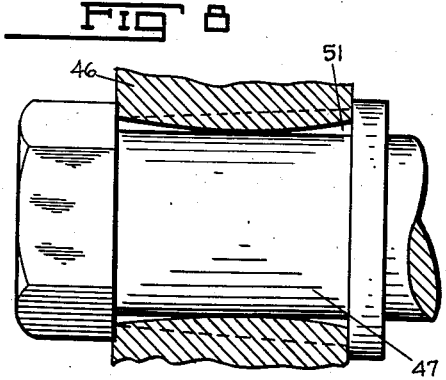
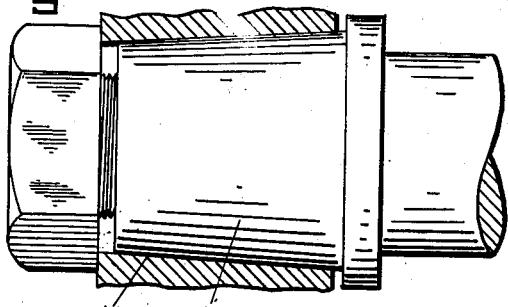
INVENTOR.
DILWARD T. BEARDSLEY
BY Charles R Werner
ATTORNEY.

Patented June 18, 1940

2,205,237

UNITED STATES PATENT OFFICE 2,205,237

BORING DEVICE

Dilward T. Beardsley, Wichita, Kans., assignor of one-half to Earl W. Couchman, Wichita, Kans.

Application January 12, 1938, Serial No. 184,631

3 Claims. (Cl. 77—2)

This invention relates in general to a boring device and particularly to a taper hole boring appliance, portable in construction and adapted to enlarge or taper cut a hole at any desired degree or pitch.

In the oil fields there is used in various operations a device which includes a crank shaft, a crank, a crank pin, a pitman and a walking beam. It has been found that the crank pin carrying the pitman works loose in the crank causing wear in the crank pin hole and the pin itself, with a great loss of efficiency in the operation of the structure.

When such wear occurs it has been found necessary to cease operations, take down the crank and usually the shaft which is integral with the crank. These parts, as well as the crank pin must be taken to a shop where the pin hole may be enlarged and a new pin made to fit. Often the entire assembly is replaced with new parts, a very expensive procedure. The weight of these parts is great, necessitating use of a large crew of men and the use of winches and other equipment for dismantling and transporting. Such equipment and the employment of a number of men as well as the length of time in which the rig is inoperative are expensive items and have been a source of much aggravation in the past.

To eliminate the above set out expensive procedure I have devised a hole boring mechanism which may be taken out to the rig, applied to the crank and operated by an electric motor or portable gas engine or other suitable power to rebore the hole, either straight or tapered. A new pin is then fitted to the crank and the pitman, and the rig is ready for operation.

It has been found preferable to bore a tapered hole and use a tapered pin since this method of construction will be less subject to wear and require little or no replacement.

Therefore, the objects of my invention are, first; to provide a portable boring device to be attached to the object in which the boring operation is to be performed.

Second; to provide a boring tool of the class described adapted to employ interchangeable taper bars whereby the proper taper desired may be given the opening being bored.

Third; to provide a boring tool of the class described wherein the cutting tool is slidably positioned on a tapered guide and intermittently progressive along the guide during rotative movement of said tool.

Fourth; to provide a boring tool of the class described wherein means are provided for intermittently progressing the cutting tool along a tapered guide.

And lastly, to provide in a boring tool of the class described, an adjustable tool guide movable and adapted to be retained in any adjusted position whereby the desired pitch or taper may be given the opening being bored.

Other objects, as well as the advantages, construction and operation of my invention will be readily apparent by reference to the following specification in connection with the accompanying drawings in which:

Fig. 1 is a longitudinal, vertical sectional view through my invention applied to a crank.

Fig. 2 is a top plan view of the same with the crank in section.

Fig. 3 is an enlarged end elevational view showing the star wheel for intermittently feeding the tool support along the guide.

Fig. 4 is a fragmentary side elevational view of a modified form of tool guide, which is adjustable for the desired taper of cut.

Fig. 5 is a cross sectional view on the line 5—5 of Fig. 1.

Fig. 6 is an end elevational view of the drive end of the mechanism.

Fig. 7 is a fragmentary section and elevation of the crank and shaft, the pitman pin and pitman of a rig mechanism as used in the oil field today.

Fig. 8 is an enlarged fragmentary view showing the result of wear in the pin and the opening in the crank.

Fig. 9 is an enlarged fragmentary view of a crank and pin wherein the opening in the crank has been taper bored by my device and the pin made to fit the tapered opening.

Referring now to the drawings by numerals of reference 1 designates a casing or housing in which the rotatable member or shaft 2 is suitably journaled in roller bearings 3, the ends of the housing 1 carrying grease retainers 4 to prevent surplus lubricant from flowing out of the housing. The filler opening 5, closed by plug 6 is provided for the purpose of introducing lubricant to the housing.

A retaining collar 7 is held in place by lock nut 8, removal of which will allow the shaft 2 to be removed from the housing. To the reduced end 9 of the shaft 2 is keyed the gear 10, meshing with worm 11, on shaft 12 supported in bearings 13 carried by arms 14 of split collar 15 adapted to be locked into position on the housing 1 by suitable fastening means 16 passing through angular extensions 17 on said collar 15. The shaft 12 may have extension 18 carrying pulley 19 and V belt 20 which may be driven by any suitable means available such as an electric motor, gasoline engine or the like.

The end of the shaft 2 opposite the drive end carries an elongated extension or guide 21 substantially semi-circular in cross section, the surface 22 being inclined or tapered as shown and dovetailed as at 23 to retain tool support or slide 24 in sliding relation with said guide 21.

A screw 25 parallels the guide 21 and has one end rotatably journaled in the shaft 2 and the other end rotatably carried by the support 26 suitably secured to the end of the guide 21. The tool support or slide 24 is threadedly engaged to the screw 25 and is adapted to be moved along the dovetailed guide upon rotation of the screw, the slide 24 being threaded at only one end thereof as indicated at 25'. A slide spacer 27 is positioned between the tool slide 24 and the dovetail 23 and set screws 28 threaded in the tool slide 24 press against the spacer 27 to hold the tool slide in adjusted sliding position.

The cutting tool 29 fits the square opening 30 in the tool support or slide 24, said tool resting against the tapered end 31 of tool adjustment screw 32 whereby the vertical position of the tool may be changed to the exact amount of cut desired. The set screw 33 may be turned up against the tool to hold it stationary.

The end of the screw 25 carries a squared portion 34 adapted to receive a crank or handle 35 so that the screw 25 may be manually rotated to move the cutting tool and guide to starting or to any other desired position.

A star-wheel 36 is secured to the screw 25 and is intermittently rotatable by contact with the star-wheel actuator 37 adjustably held in transverse support 38 secured to the plate 39. A thumb screw 40 or other suitable means may be provided for locking the actuator 37 in desired position. The plate 39 assists in holding the entire boring device in operating position on the object being bored, by use of the bolts 41 which pass through openings in plates 39 and flange 42 of housing 1. Set screws 43 in the flange 42 are provided for steadying said flange on the crank. Reinforcement webs 44 are provided between the flange 42 and the housing 1.

In Fig. 7 I have shown a fragmentary view of a crank shaft 45 and crank 46, and a pin 47 and pitman 48 in operating position. This structure is what is now being used in the majority of rigs throughout the oil field industry. The straight pin 47 becomes worn and results in a loose fit and in wearing of the opening 48 in which it is positioned, as shown in the enlarged fragmentary view Fig. 8. After the use of my boring device a tapered hole is provided and a tapered pin 50 is used, providing a snug fit and elimination of undue wear.

The use and operation of my device is relatively simple. Prior to application of the boring tool, the pitman and pitman pin are removed. My device is applied to the crank, the cutting tool being in starting position, that is, adjacent the end of shaft 2. The star-wheel 36 is removed prior to insertion of the shaft extension or guide 21 in the opening 51 and is then reaffixed to the screw 25. The bolts 41 draw the plate 39 and flange 42 into secure position on the crank, and the star-wheel actuator 37 is adjusted and locked in proper position.

A suitable driving means is provided, such as an electric motor, gasoline engine or other means, which may be connected through a V-belt 20 to the pulley 19 to drive worm and gear 11 and 10, and shaft 2 with extension 21. The star-wheel 36 will move in a path about the central axis of the shaft 2 and at every revolution one point of the star wheel will contact the actuator 37 and rotate the screw 25 slightly to advance the cutting tool for a fresh cut. The amount of movement of the tool can be changed by moving the actuator 37 up or down to vary the length of contact with the star wheel.

As the cutting tool is slowly rotated it will advance along the tapered guide by means of the star-wheel and screw, the taper of the resultant hole being the same as the taper of the guide 21. If a different taper is desired, a number of shafts 2 may be provided with different tapered extensions 21 and the extension with the proper taper is used in the device.

I have provided a modification in my device whereby the taper of the boring tool guide may be changed without removing the entire guide. In Fig. 4 I have shown a fragment of the shaft 2 carrying an extension 2' and a guide 22' pivoted to the shaft 2 at 52 and adapted to be raised or lowered by means of the adjustment screw 53 threadedly engaging the extension 2' and rotatably secured to the guide 22'. By these means the guide may be adjusted to any desired taper in a simple, efficient and expeditious manner.

From the foregoing it will be apparent that I have provided a relatively simple boring device, portable in construction and efficient in operation, use of which will eliminate the necessity of dismantling worn equipment and removing same to shops provided with special machinery for alterations and repairs. Much time and money will be saved by use of my invention and the repaired and replaced parts will provide a better and longer lasting construction than heretofore used.

It is obvious that changes in form, proportion and details of construction may be resorted to without departing from the spirit of my invention, and therefore I reserve all rights to any changes which come within the scope of these specifications and the following claims.

What I claim as new and desire to secure by Letters Patent is:

1. In a boring device of the class described for cranks, a support comprising a housing, a transverse flange at one end of said housing, means for affixing said flange to the crank, a shaft rotatably carried in said housing, means on the end of the shaft remote from the flange for rotating said shaft, a tapered extension on the other end of the shaft projecting beyond the housing, a cutting means slidably carried by said tapered extension, automatic means for moving the cutting means along the tapered extension during rotation of the shaft.

2. In a boring device of the class described for cranks having a plurality of openings therein, a support comprising a housing, a transverse flange on said housing, means including one or more of the openings in the crank for securing the flange to the crank to taper bore another of the openings in the crank, a shaft rotatably carried in said housing, means on the end of the shaft remote from the flange for rotating said shaft, a tapered extension on the other end of the shaft projecting beyond the housing, a cutting means slidably carried by said tapered extension, automatic means for moving the cutting means along the tapered extension during rotation of the shaft.

3. In a boring device of the class described for cranks, a support comprising a housing, a transverse flange at one end of said housing, means for affixing said flange to the crank, a shaft rotatably carried in said housing, means on the end of the shaft remote from the flange for rotating said shaft, a tapered extension on the other end of the shaft projecting beyond the housing, the outside diameter of said extension being not more than the outside diameter of the shaft, a cutting means slidably carried by said tapered extension, and automatic means for moving the cutting means along the tapered extension during rotation of the shaft.

DILWARD T. BEARDSLEY.